(12) United States Patent
Eck et al.

(10) Patent No.: US 7,451,952 B2
(45) Date of Patent: Nov. 18, 2008

(54) THERMOFORMING A CONTINUOUS FOIL

(75) Inventors: Werner Eck, Laupheim (DE); Werner Florczak, Schemmerhofen (DE); Norbert Damaschke, Dettingen (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 808 days.

(21) Appl. No.: 10/928,753

(22) Filed: Aug. 27, 2004

(65) Prior Publication Data
US 2005/0051929 A1 Mar. 10, 2005

(30) Foreign Application Priority Data
Sep. 4, 2003 (DE) .................. 103 41 287

(51) Int. Cl.
*B29C 31/00* (2006.01)
(52) U.S. Cl. .................. 246/101; 264/539; 264/544; 264/554; 264/320; 425/387.1; 425/388; 425/394; 425/397
(58) Field of Classification Search ........... 364/539, 364/544, 101, 554
See application file for complete search history.

(56) References Cited
U.S. PATENT DOCUMENTS
3,562,859 A * 2/1971 McIntyre .................. 425/310

| | | | | |
|---|---|---|---|---|
| 4,666,394 A | * | 5/1987 | Wakamiya et al. | 425/342.1 |
| 4,883,419 A | * | 11/1989 | Queirel | 425/326.1 |
| 5,980,231 A | | 11/1999 | Arends et al. | |

FOREIGN PATENT DOCUMENTS

| | | |
|---|---|---|
| CA | 2 409 684 | 5/2003 |
| CH | 625 742 | 10/1981 |
| DE | 81 15 644 | 11/1982 |

\* cited by examiner

*Primary Examiner*—Jeff H Aftergut
(74) *Attorney, Agent, or Firm*—Andrew Wilford

(57) ABSTRACT

A section of a foil is sandwiched between an upper die and a first lower die and heat deformed into a cavity of the first lower die while simultaneously synchronously displacing the upper die, the first lower die, and the foil downstream. Then the upper die is raised and recirculated back upstream while cooling the section of foil in the cavity of the first lower die and displacing the lower die with the section of the foil downstream. Another section of the foil is sandwiched between the upper die and a second lower die and heat deformed into a cavity of the second lower die while simultaneously synchronously displacing the upper die, the second lower die, and the foil downstream. The first lower die is disengaged from the foil in the downstream station and recirculated back upstream to the upstream station. These steps are then repeated.

11 Claims, 8 Drawing Sheets

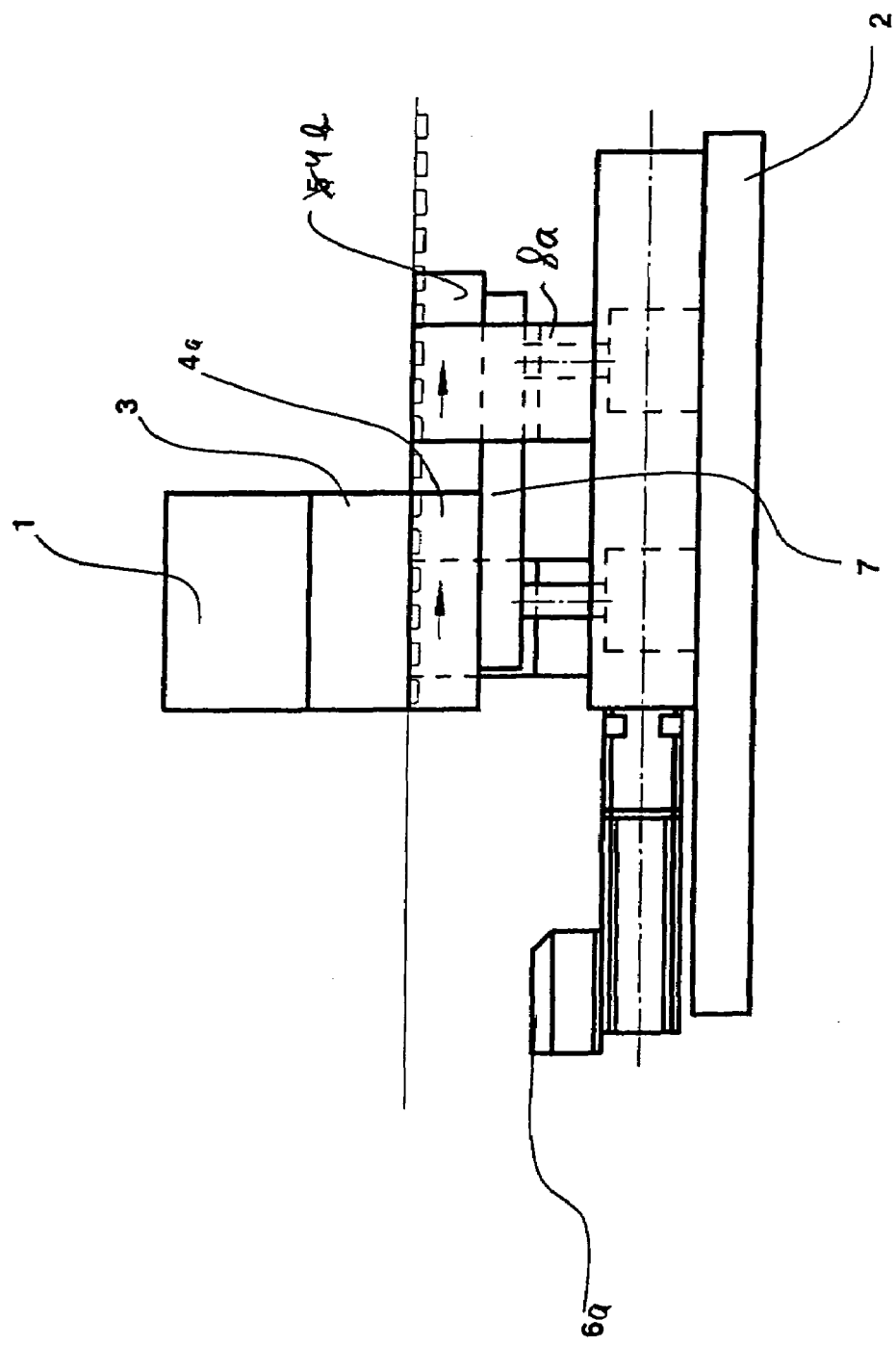

THERMOFORMING A CONTINUOUS FOIL

FIELD OF THE INVENTION

The present invention relates to a method of and apparatus for thermoforming a foil or film. More particularly this invention concerns the formations of a plurality of pockets in a plastic foil in a continuously moving or stepped production process.

BACKGROUND OF THE INVENTION

In order to make a shaped foil or film workpiece, for instance a multipocket tray for holding yogurt or other foodstuffs, it is standard to produce a planar thermoplastic foil, e.g. of polyvinyl chloride or polypropylene, and then grip it between two dies, a flat upper one and a lower one formed with upwardly open cavities as it moves downstream in steps. Suction applied to the cavities pulls down the foil to form in it a plurality of pockets as the foil moves downstream in steps sandwiched between the upper and lower dies. As the foil moves downstream it cools and cures so that it can be pulled out of the lower-die cavities as a semifinished workpiece. During the cooling/curing phase, the upper die can be pulled back and returned upstream. Once the upper die is back in its upstream position the lower die can be recirculated back to mate with it to restart the cycle with another section of the foil.

The problem with such systems, as described in U.S. Pat. No. 5,980,231 of Arends and German Utility Model 81 15 644, is that when working at high production rates there is insufficient time for the workpiece to cure to a dimensionally stable amount before it is stripped out of the lower die, because the step interval is all that is available for curing of the foil. Thus the foil can shrink or deform and become unusable.

OBJECTS OF THE INVENTION

It is therefore an object of the present invention to provide an improved method and apparatus for thermoforming a foil. 1! Another object is the provision of such an improved method and apparatus for thermoforming a foil which overcomes the above-given disadvantages, that is which ensures that the foil is completely cured by the time it is separated from the lower die.

SUMMARY OF THE INVENTION

An elongated foil according to the invention is made by sandwiching a section of the foil in an upstream station between an upper die and a first lower die and heat deforming the section into a cavity of the first lower die while simultaneously synchronously displacing the upper die, the first lower die, and the foil horizontally downstream toward a downstream station. Then the upper die is separated from the section of the foil and recirculated back to the upstream station while cooling the section of foil in the cavity of the first lower die and displacing the lower die with the section of the foil into the downstream station. After the first lower die is downstream clear of the first station and the upper die has been recirculated back to the upstream station, another section of the is foil is sandwiched in the upstream station between the upper die and a second lower die and heat deformed into a cavity of the second lower die while simultaneously synchronously displacing the upper die, the second lower die, and the foil horizontally downstream toward the downstream station. The first lower die is disengaged from the foil in the downstream station and recirculated back upstream to the upstream station. These steps are then repeated with alternation of the first and second lower dies on succeeding sections of the foil.

Such a system can work perfectly well with a as continuously advancing workpiece, that is a foil that moves at a constant and essentially unchanging speed. The curing time is not limited to a portion of one advance step, but can be set long enough that, by the time the foil is stripped from the lower die, it is dimensionally stable. In fact according to the invention the foil is always engaged with one or the other of the lower dies which themselves can serve to pull the foil downstream and keep it taut, eliminating the need for a separate system pulling the foil downstream and keeping it taut. To this end the lower dies are displaced parallel to the transport direction during downstream travel, and normally also during upstream travel when being recirculated.

Further according to the invention the first and second lower dies and the foil are actively cooled during displacement of the first and second lower dies from the upstream station to the downstream station. This can be done by circulating a coolant through the lower dies.

A subatmospheric pressure is applied through the lower dies to the foil to deform the foil into the cavities of the lower dies. The cavities of the lower dies are upwardly open pockets and the interfit of the deformed foil with the pockets couples the foil to the lower dies when the lower dies are engaged with the foil.

An apparatus for thermoforming an elongated foil has according to the invention a vertically displaceable upper die displaceable horizontally above a conveyor path from an upstream station toward a downstream station and first and second lower dies each vertically displaceable between an upper position engaging the foil and a lower position disengaged from the foil and horizontally between the upstream and downstream stations. The foil extends along the path through the stations. A controller with respective drives is responsible for the alternating recirculating movement of the first and second lower dies as described above.

The drives of the lower dies each include a horizontal guide parallel to the path and a motor and a releasable holder on each of the guides carrying the respective lower die. While two separate horizontal drives are needed, one for each lower die, it is only necessary to provide one vertical drive for raising and lowering them, since only one is being moved vertically at a time, that is during the vertical movement of one of them the other is always moving purely horizontally. In fact the raising and lowering drive can be set to simply pull the downstream lower die down out of its holder, whereupon it is shifted upstream and raised back up to be reset in a holder. The vertical drive has a bar extending from the upstream end of the upstream station to the downstream end of the downstream station and simply moves between an up position in which it pushes one of the lower dies up in the upstream station into its upper position against the foil and a down position as one of the lower dies is recirculated horizontally back upstream. While the lifting bar is in its lower position, whichever lower die that is in its upper position and traveling downstream is held up by engagement with its gripper, not by being supported by the lifting bar.

The pulling element that shifts the lower dies downstream can be horizontally displaceable to accommodate the apparatus to dies of different lengths. The one longitudinal or horizontal drive normally engages to the outer or left side of the travel path and the other to the inner or right side. A carriage on each such horizontal drive has an upper end formed as a grab or holder for the respective lower die.

BRIEF DESCRIPTION OF THE DRAWING

The above and other objects, features, and advantages will become more readily apparent from the following description, reference being made to the accompanying drawing in which:

FIG. 6 is a schematic side view of the apparatus; and

SPECIFIC DESCRIPTION

Figure 1:
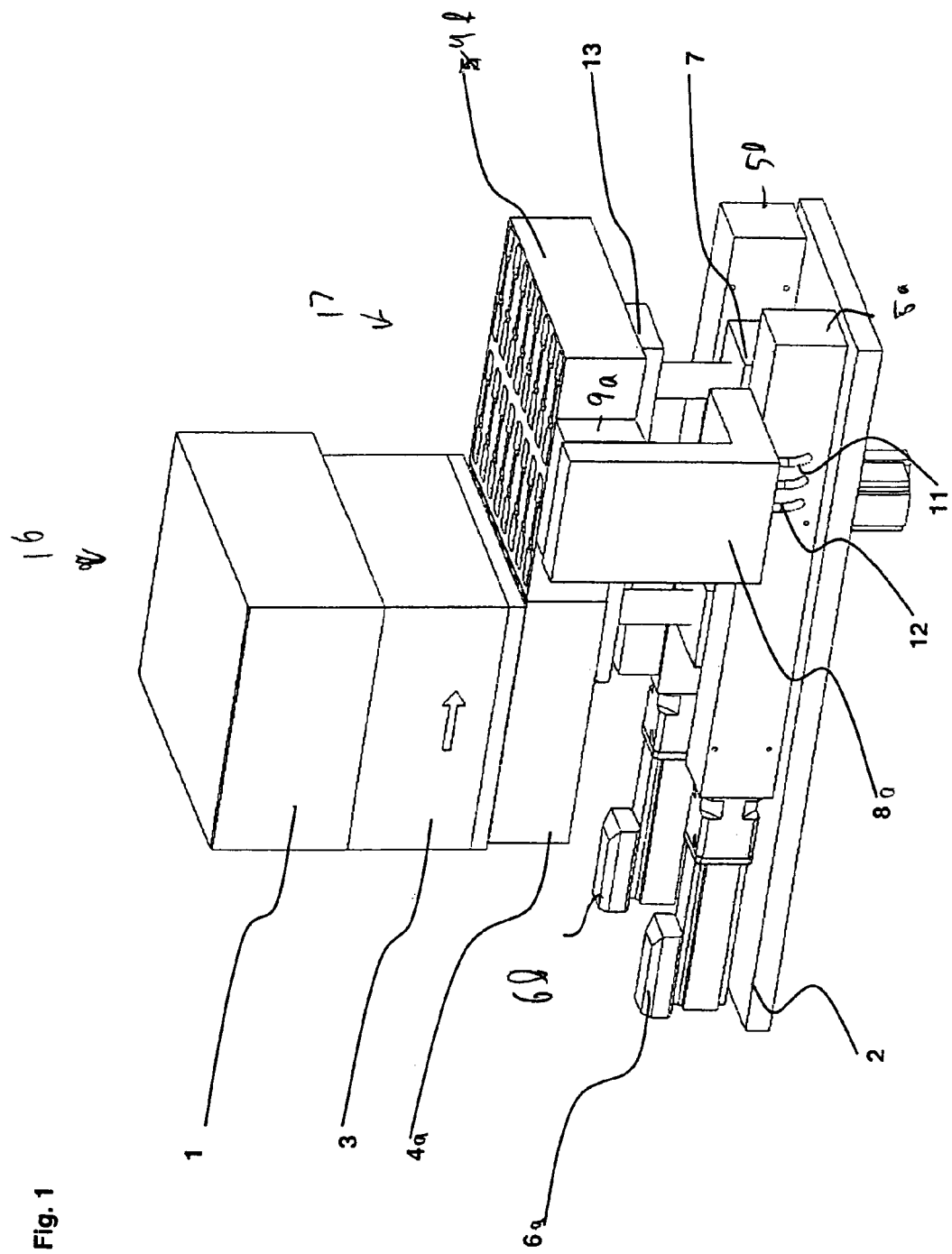
FIG. 1 is a perspective view of the apparatus according to the invention.
Figure 2:
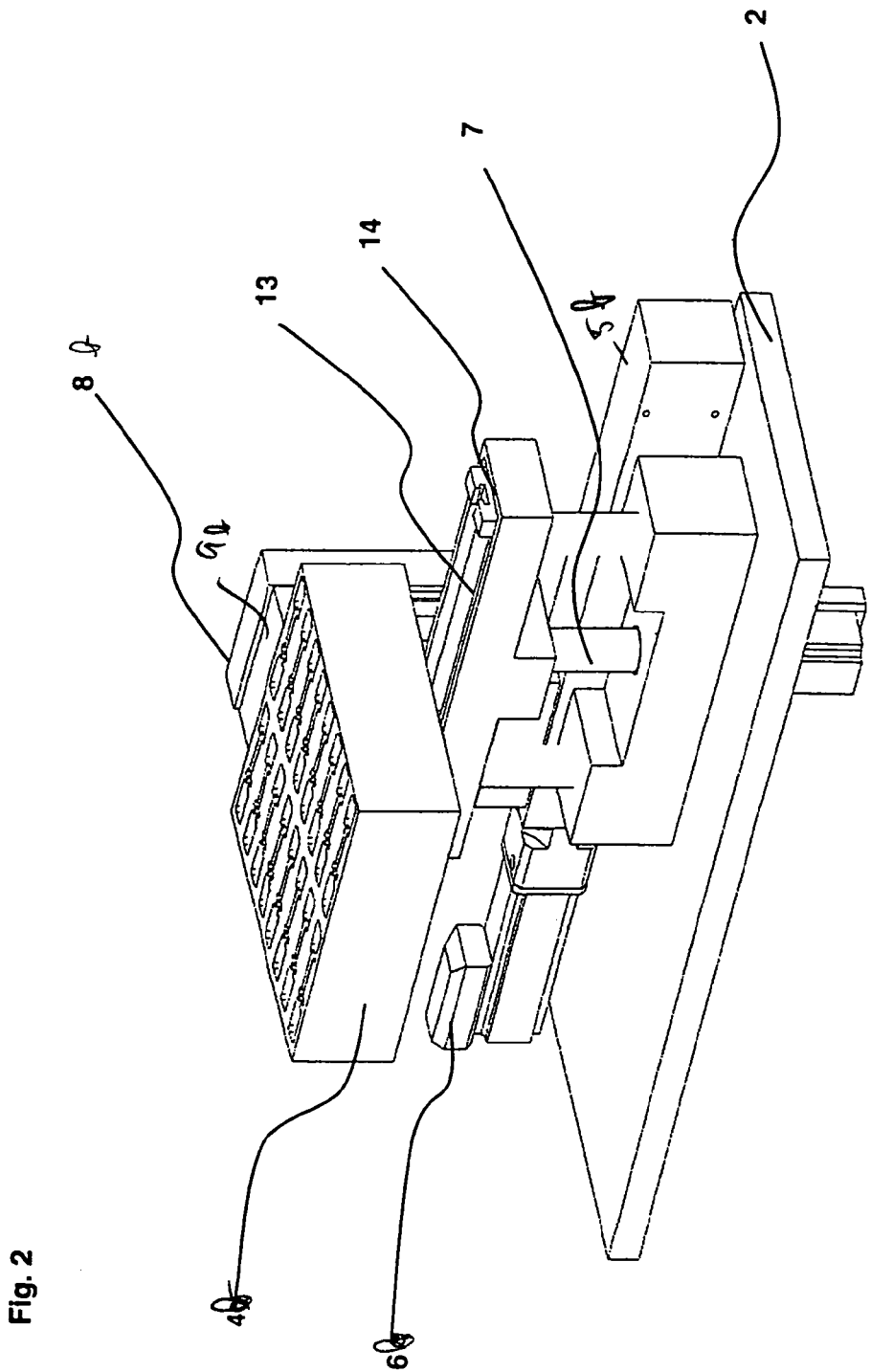
FIG. 2 is a view like FIG. 1 but without the upper die and second lower die assemblies.
Figure 3:
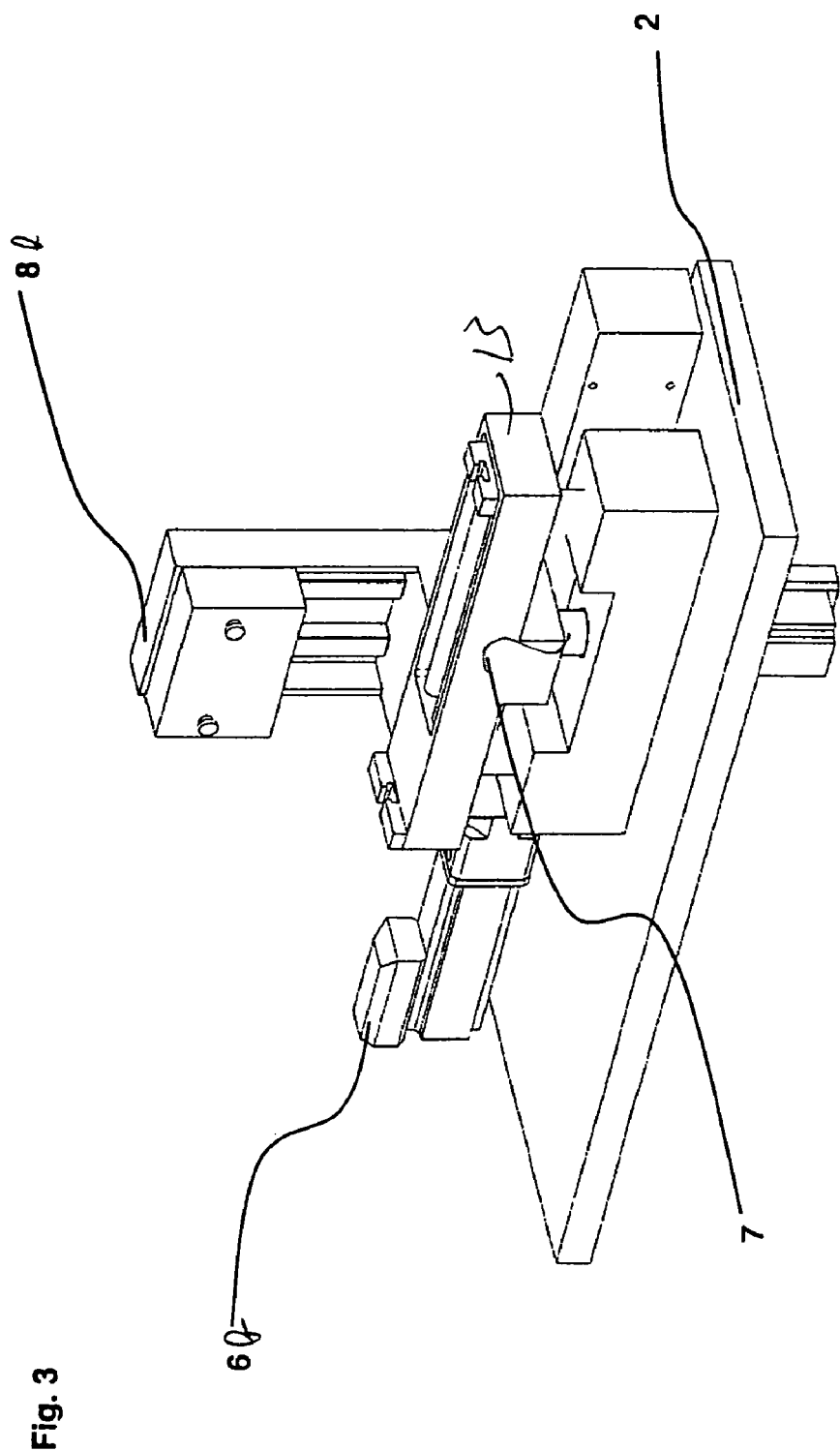
FIG. 3 is a view like FIG. 2 but without the second lower dies
Figure 4:
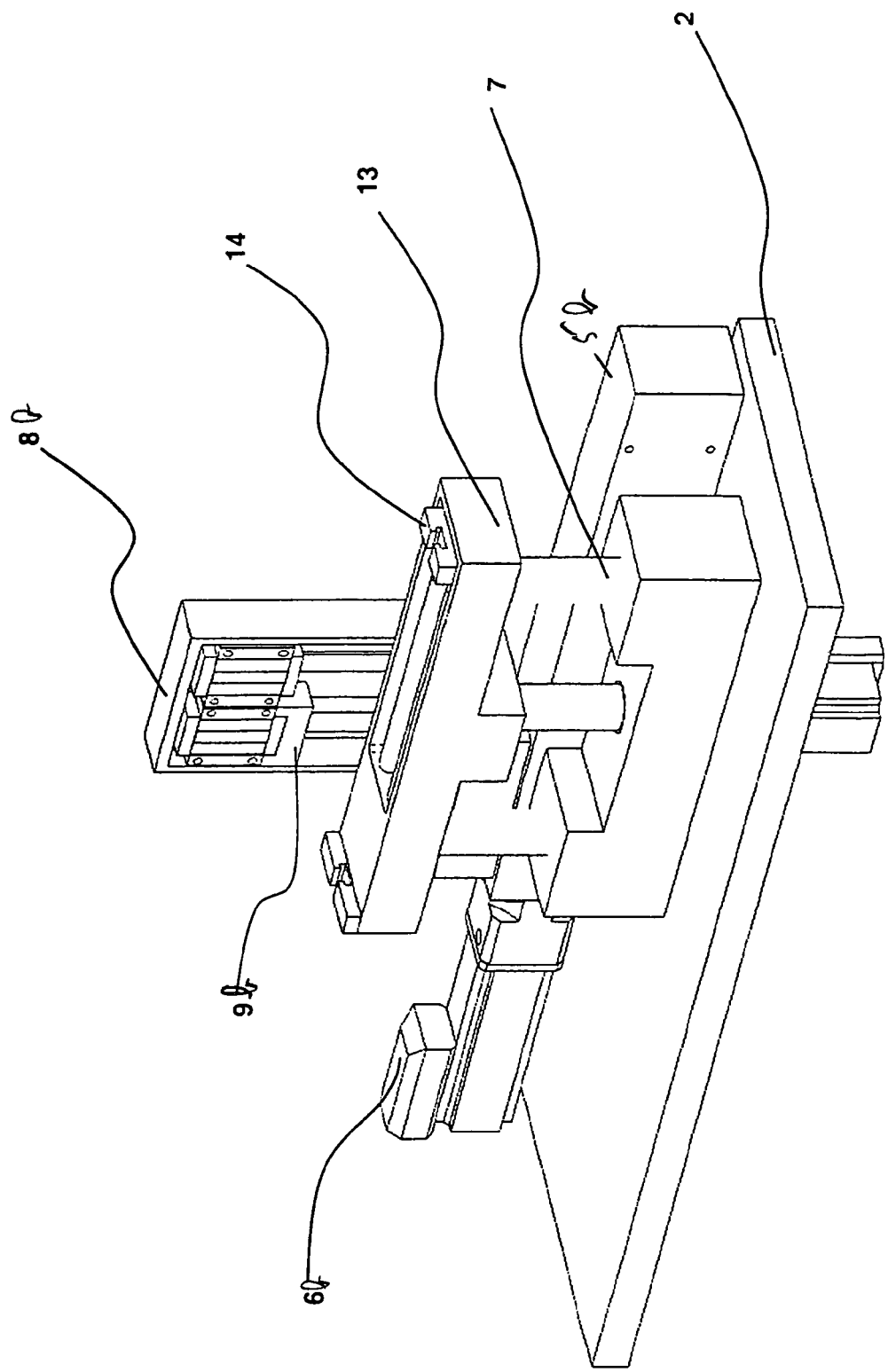
FIG. 4 is a view like FIG. 3 but without the stop.
Figure 5:
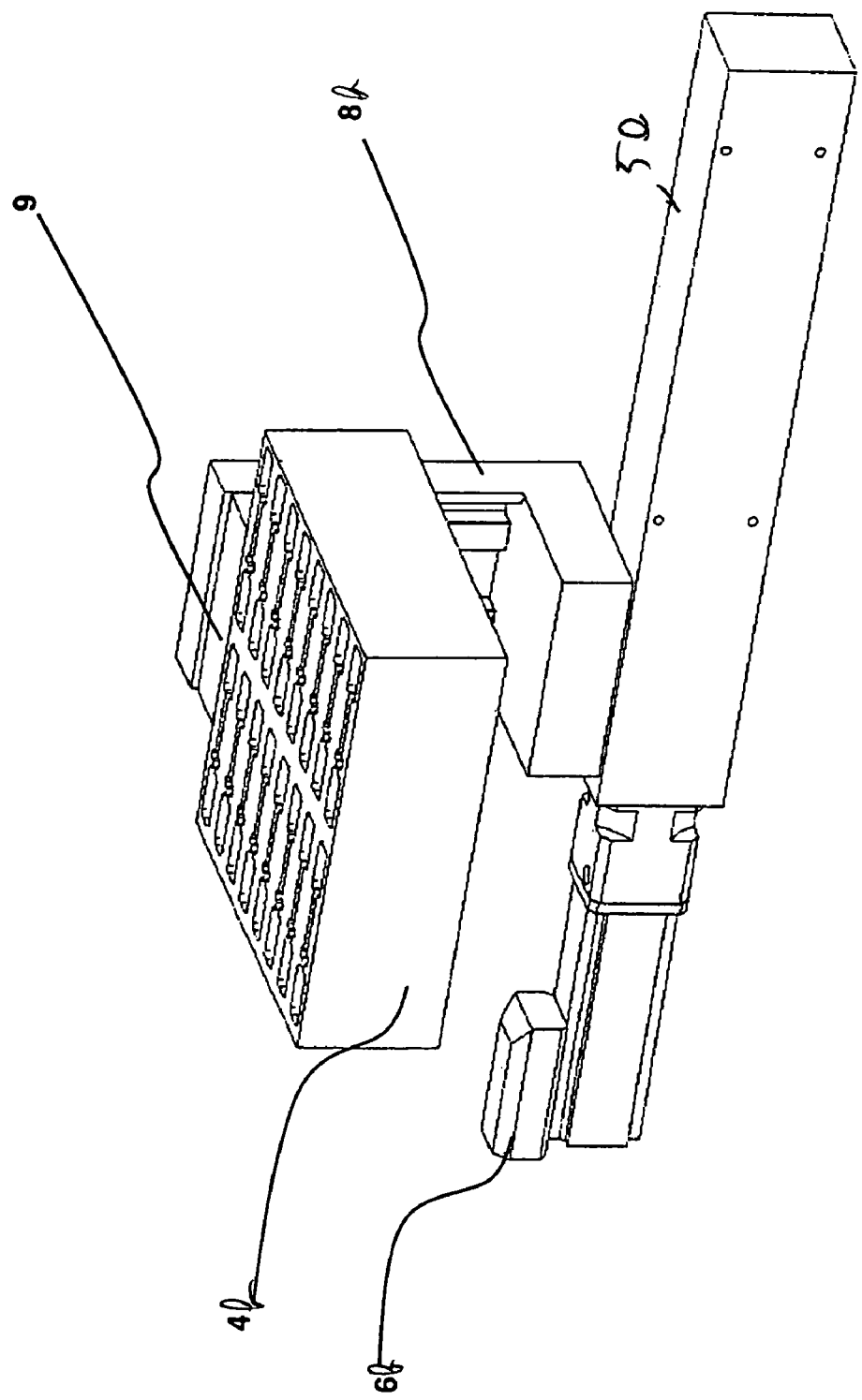
FIG. 5 is a view like FIG. 4 only of one of the lower dies with its horizontal drive system.
Figure 7A:
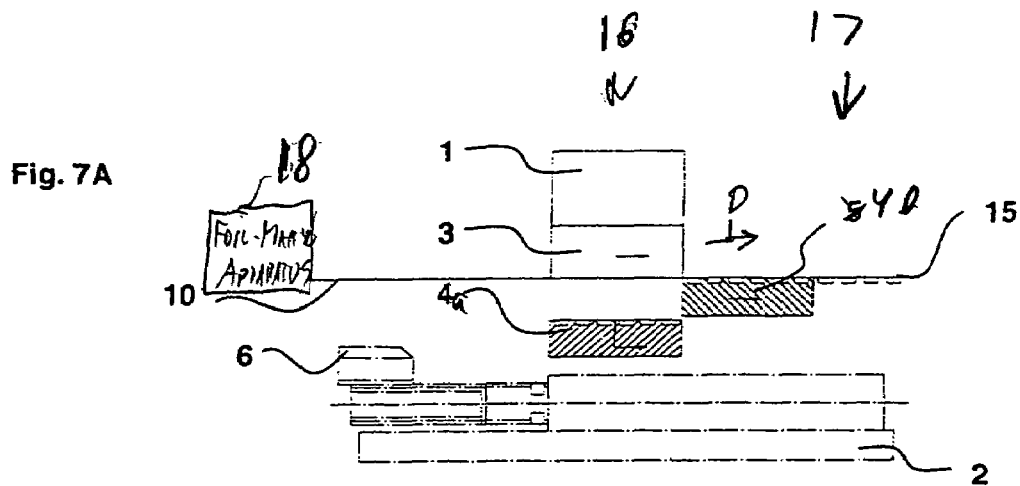
FIGS. 7A through 7F show how the apparatus of this invention carries out the method of the present invention.

As seen in FIGS. 1 through 6, a thermoforming apparatus in accordance with the invention has an elongated base 2 extending horizontally underneath a transport path extending in a travel direction D through an upstream treatment station 16 and a downstream treatment station 17. An upper die 3 is vertically displaceable by an actuator shown schematically at 1 and is also limitedly horizontally displaceable from an upstream position in the station 16 to a downstream position offset downstream therefrom toward the station 17. First and second lower dies 4a and 4b are each vertically displaceable between an upper position and a lower position by a lifter bar 13 and horizontally displaceable along respective guide rails 5a and 5b by respective actuators 6a and 6b. A cooler having a coolant line 11 is is connected to each of the carriages 8a and 8b as well as a suction line 12 of an unillustrated pump. FIG. 7A shows how an extruder 18 continuously produces a hot polypropylene or polyvinyl chloride foil 10 that extends along the path in the direction D through both of the stations 16 and 17.

More particularly, the carriages 8a and 8b are formed as upright posts and slidable along the rails 5a and 5b, the one carriage 8b being offset toward the back of the apparatus and the other carriage 8a toward the front so that they can pass each other. The upper ends of these carriages 8a and 8b carry respective holders 9a and 9b, e.g. magnetic chucks, which can grip the dies 4a and 4b sufficiently strongly to entrain them in movement in the direction D but from which the dies 4a and 4b can be detached when necessary. To this end the lifter rail 13 extending in the direction D between the rails 5a and 5b can be raised and lowered by an actuator or drive 7 and carries at its downstream end a grab 14 that can grip one of the dies 4a or 4b in the downstream station 17 and pull it from the respective holder 9a or 9b and displace it vertically.

The apparatus described above functions as follows:

To start with as shown in FIG. 7A the foil 10 is extending in the direction D through both of the stations 16 and 17 and in fact moving at a constant speed. The first lower die 4a is positioned in its lower position in the station 16 but well below and out of contact with the foil 10, and the second lower die 4b is downstream of the upstream station 16 but not completely in the downstream station 17 and is in its upper position engaging the foil 10.

Figure 7B:
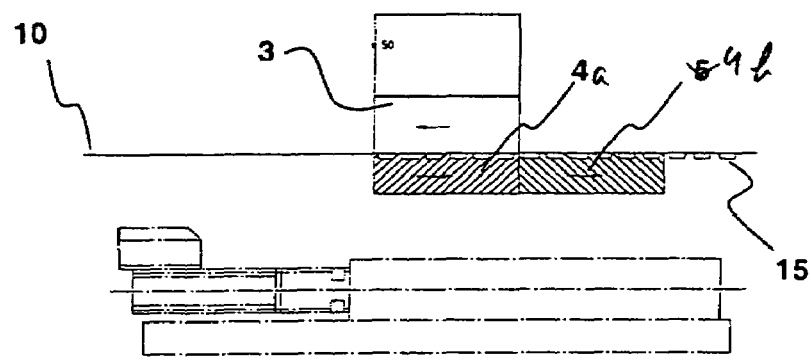

Then as shown in FIG. 7B the upper die 3 is moved downward slightly to contact the upper face of the foil 10 and the first lower die 4a is moved upward to press the foil 10 against the upper die 3, thereby snugly sandwiching a section of the foil 10 between the dies 3 and 4a. As soon as the two dies 3 and 4a are in solid engagement with the foil 10 they are moved synchronously downstream with the foil 10 and with the second lower die 4b. As they move downstream at first the heat of the dies 3 and 4a and/or the latent heat of the foil 10 plus the subatmospheric pressure applied to pockets or cavities in the lower die 4a forms pockets 15 in the foil 10.

Figure 7C:
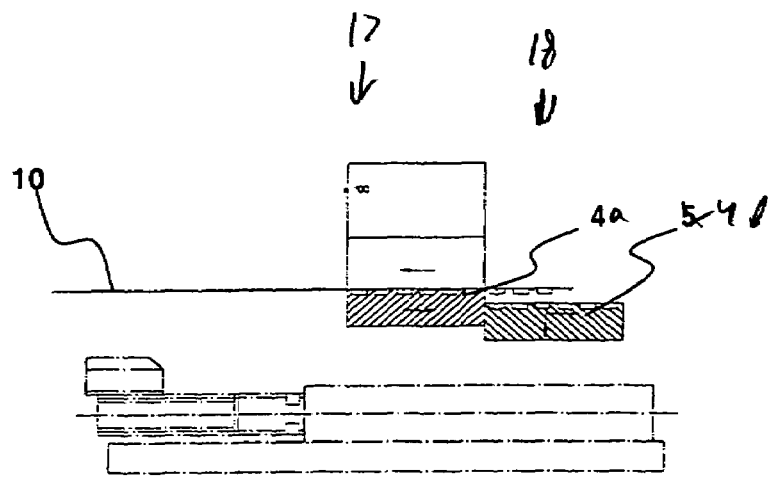

Once the pockets 15 are formed in the foil 10 as shown in FIG. 7C, the second die 4b is moved downward while the dies 3 and 4a continue to move downstream, at which time the foil section between them cures.

Figure 7D:
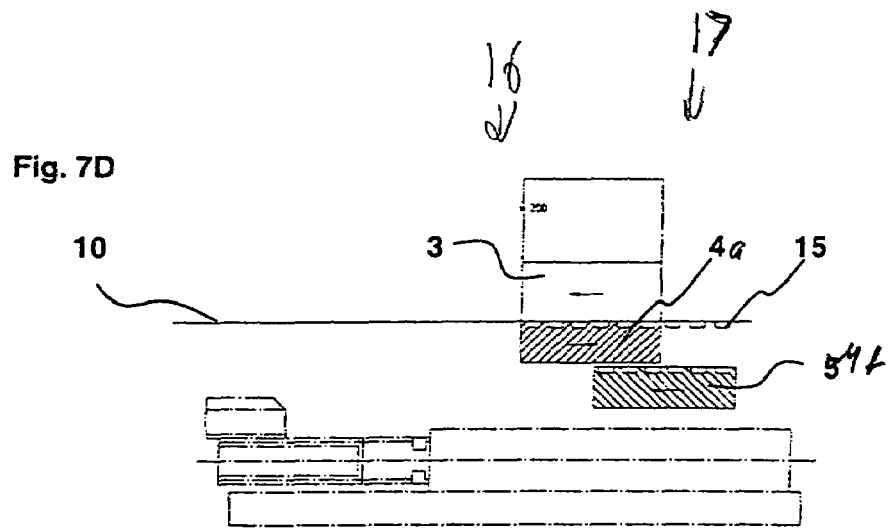
Figure 7E:
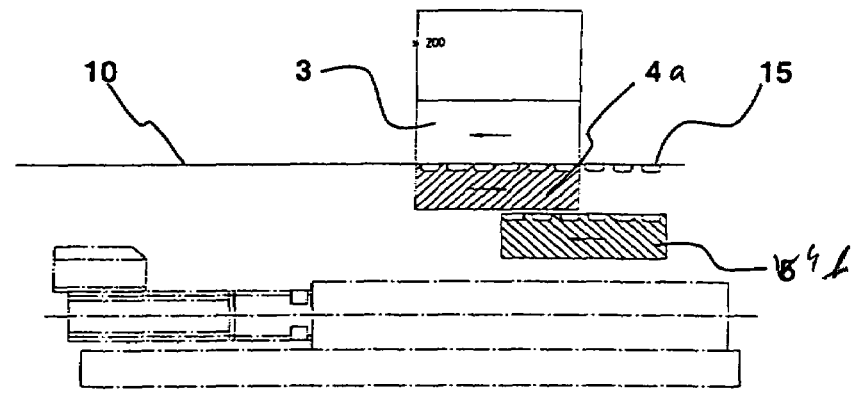

Once the second die 4b is below the die 4a it is moved back upstream as shown in FIGS. 7D and 7E, sliding along the lifting bar 13. At the same time the upper die 3 is raised and moved back upstream toward the upstream station 16.

Figure 7F:
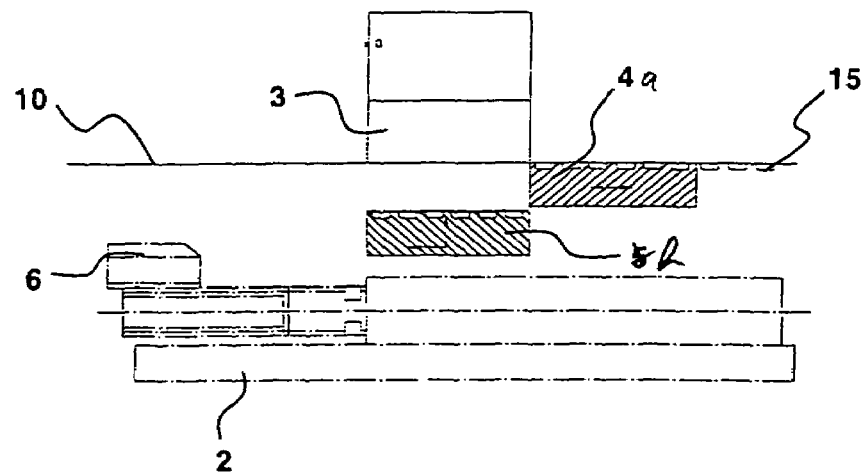

Finally as shown in FIG. 7F, the parts have assumed the same positions as in FIG. 7A, except that the dies 4a and 4b have switched positions. During this entire operation the foil 10 has kept moving continuously at a constant speed, although of course the system would also work with stepped forward advance of the foil 10. In any case the engagement of the foil pockets 15 in the cavities of the lower dies 4a and 4b is sufficient to keep the foil 10 moving downstream and taut.

As a general matter it should be noted that the forming station of the invention has two lower dies which are shifted in height by only one actuator or drive 7. To that end, the first lower die is raised by the drive 7 and is coupled to a respective holder (9a, 9b) while the drive 7 is decoupled from the first lower die and returns downward. With this movement downwardly, the second die, that has previously passed though a forming cycle, is again carried downwardly with the grab 14 engaging in the second lower die for that purpose. Since a single drive raises and lowers both lower dies, cooperation with the holder is required to retain the active lower die in its raised position while the drive lowers the other lower die.

We claim:

1. A method of thermoforming an elongated foil, the method comprising the steps of:
    a) sandwiching a section of the foil in an upstream station between an upper die and a first lower die and heat deforming the section into a cavity of the first lower die while simultaneously synchronously displacing the upper die, the first lower die, and the foil horizontally downstream toward a downstream station;
    b) thereafter separating the upper die from the section of the foil and recirculating the upper die back to the upstream station while cooling the section of foil in the cavity of the first lower die and displacing the first lower die with the section of the foil into the downstream station;
    c) after the first lower die is downstream clear of the first station and the upper die has been recirculated back to the upstream station and while the first lower die is still in the downstream station, sandwiching another section of the foil in the upstream station between the upper die and a second lower die and heat deforming the other section into a cavity of the second lower die while simultaneously synchronously displacing the upper die, the second lower die, and the foil horizontally downstream toward the downstream station;
    d) disengaging the first lower die from the foil in the downstream station and recirculating the first lower die back upstream to the upstream station; and
    e) repeating steps a) through d) with alternation of the first and second lower dies on succeeding sections of the foil.

2. The foil-thermoforming method defined in claim 1 wherein the lower die is not disengaged from the foil in the downstream station until after the foil is sandwiched in the upstream station between the upstream die and the other lower die, whereby at all times one of the lower dies is in contact with the foil.

3. The foil-thermoforming method defined in claim 2 wherein the foil is transported downstream by entrainment by the lower dies.

4. The foil-thermoforming method defined in claim 3 wherein the foil is moved continuously downstream.

5. The foil-thermoforming method defined in claim 1, further comprising the steps of:
cooling the first and second lower dies and the foil during displacement of the first and second lower dies from the upstream station to the downstream station.

6. The foil-thermoforming method defined in claim 1 wherein a subatmospheric pressure is applied through the lower dies to the foil to deform the foil into the cavities of the lower dies.

7. The foil-thermoforming method defined in claim 6 wherein the cavities of the lower dies are upwardly open pockets and the interfit of the deformed foil with the pockets couples the foil to the lower dies when the lower dies are engaged with the foil.

8. An apparatus for thermoforming an elongated foil, the apparatus comprising:
a vertically displaceable upper die displaceable horizontally above a conveyor path from an upstream station toward a downstream station, the foil extending along the path through the stations;
first and second lower dies each vertically displaceable between an upper position engaging the foil and a lower position disengaged from the foil and horizontally between the upstream and downstream stations; and
control means including respective drives connected to the dies for
sandwiching a section of the foil in an upstream station between the upper die and the first lower die and heat deforming the section into a cavity of the first lower die while simultaneously synchronously displacing the upper die, the first lower die and the foil horizontally downstream toward a downstream station,
thereafter separating the upper die from the section of the foil and recirculating the upper die back to the upstream station while cooling the section of foil in the cavity of the first lower die and displacing the lower die with the section of the foil into the downstream station,
after the first lower die is downstream clear of the first station and the upper die has been recirculated back to the upstream station and while the first lower die is still in the downstream station, sandwiching another section of the foil in the upstream station between the upper die and the second lower die and heat deforming the other section into a cavity of the second lower die while simultaneously synchronously displacing the upper die, the second lower die, and the foil horizontally downstream toward the downstream station, and
disengaging the first lower die from the foil in the downstream station and recirculating the first lower die back upstream to the upstream station.

9. The foil-thermoforming apparatus defined in claim 8 wherein the drives of the lower dies each include a horizontal guide parallel to the path and a motor.

10. The foil-thermoforming apparatus defined in claim 9 wherein the drives of the lower dies each include a releasable holder on each of the guides carrying the respective lower die.

11. The foil-thermoforming apparatus defined in claim 8, further comprising
means for cooling the first and second lower dies and the foil during displacement of the first and second lower dies from the upstream station to the downstream station.

* * * * *